(12) United States Patent
Deboeuf, Jr. et al.

(10) Patent No.: US 9,855,716 B2
(45) Date of Patent: Jan. 2, 2018

(54) DEVICE FOR CUTTING AND TRANSFERRING A STRIP FOR THE ASSEMBLY OF A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Michel Deboeuf, Jr., Clermont-Ferrand (FR); Thierry Ducros, Clermont-Ferrand (FR); Stephane Ravat, Clermont-Ferrand (FR); Mickael Rouby, Clermont-Ferrand (FR)

(73) Assignees: Compagnie Generale des Etablissements Michelin, Clermont-Ferrand (FR); Michelin Recherche et Technique, S.A., Granges-Paccot (CH)

(*) Notice: Subject to any disclaimer, the term of this patent is extended or adjusted under 35 U.S.C. 154(b) by 61 days.

(21) Appl. No.: 14/409,081

(22) PCT Filed: Jun. 18, 2013

(86) PCT No.: PCT/EP2013/062609
§ 371 (c)(1),
(2) Date: Dec. 18, 2014

(87) PCT Pub. No.: WO2013/189922
PCT Pub. Date: Dec. 27, 2013

(65) Prior Publication Data
US 2015/0298409 A1    Oct. 22, 2015

(30) Foreign Application Priority Data
Jun. 22, 2012   (FR) ...................... 12 55900

(51) Int. Cl.
*B29D 30/30* (2006.01)
*B29D 30/46* (2006.01)
*B29D 30/00* (2006.01)

(52) U.S. Cl.
CPC ..... *B29D 30/3042* (2013.01); *B29D 30/0016* (2013.01); *B29D 30/0061* (2013.01);
(Continued)

(58) Field of Classification Search
CPC .... B29D 30/16; B29D 30/1607; B29D 30/30; B29D 30/3007; B29D 30/46;
(Continued)

(56) References Cited

U.S. PATENT DOCUMENTS 2,539,240 A * 1/1951 Firestone ............... B29D 30/52
83/176
4,990,203 A * 2/1991 Okada ................ B29D 30/3028
152/533
(Continued)

FOREIGN PATENT DOCUMENTS

EP    0518691 A2    12/1992
EP    0561609       * 9/1993   ............. B29D 30/30
(Continued)

OTHER PUBLICATIONS

Machine generated English language translation of JP 62-109629 (original document dated May 1987).*
(Continued)

*Primary Examiner* — Martin Rogers
(74) *Attorney, Agent, or Firm* — Dickinson Wright, PLLC

(57) ABSTRACT

Device for cutting and transferring a length of strip let off a continuous strip, comprising a first face and a second face to be laid on a rotary receiving surface and containing
a cutting means to separate the said length from the continuous strip along a cutting line,
(Continued)

a telescopic conveyor belt, arranged in a longitudinal direction between the cutting means and the receiving surface, to receive the length of strip via the first face, a first half-anvil, upstream of the cutting line, and comprising holding means to grasp the strip via the first face, a transporter, having holding means to grasp the front edge or rear edge of the length of strip via the second face, the transporter able to move in the longitudinal direction. A second half-anvil is intended to collaborate with the first half-anvil during cutting, and positioned downstream of the cutting line and upstream of the telescopic conveyor belt, comprising holding means able to grasp the rear edge of the length of strip via the first face, and able to move in the longitudinal direction.

7 Claims, 2 Drawing Sheets

(52) U.S. Cl.
CPC ....... *B29D 30/305* (2013.01); *B29D 30/3007* (2013.01); *B29D 30/3057* (2013.01); *B29D 30/46* (2013.01); *B29D 2030/463* (2013.01)

(58) Field of Classification Search
CPC .......... B29D 30/463; B29D 2030/2671; B29D 2030/2678; B29D 2030/2685; B29D 2030/2692; B29D 2030/3085; B29D 2030/421; B29D 2030/422; B29D 2030/427; B29D 2030/4468; B29D 2030/4475; B29D 2030/4481; B29D 2030/4487; B29D 2030/4493; B29D 2030/463

See application file for complete search history.

(56) References Cited

U.S. PATENT DOCUMENTS

| | | | |
|---|---|---|---|
| 5,248,374 A * | 9/1993 | Shimizu | B29D 30/3007 156/133 |
| 5,385,626 A | 1/1995 | Shimizu | |
| 2006/0068474 A1 | 3/2006 | Coleman | |
| 2008/0185095 A1 | 8/2008 | Gutknecht | |
| 2009/0095597 A1* | 4/2009 | Bilodeau | B27B 5/228 198/458 |
| 2010/0095814 A1 | 4/2010 | Gutknecht | |
| 2010/0095820 A1 | 4/2010 | Gutknecht | |
| 2012/0111473 A1 | 5/2010 | Hasegawa | |

FOREIGN PATENT DOCUMENTS

| | | | | |
|---|---|---|---|---|
| EP | 0561609 A1 | | 9/1993 | |
| EP | 2431164 A1 | | 3/2012 | |
| JP | 62-109629 | * | 5/1987 | ............ B29D 30/30 |
| JP | 07-290598 | * | 11/1995 | ............ B29D 30/30 |

OTHER PUBLICATIONS

Machine generated English language translation of JP 07-290598 (original document dated Nov. 1995).*

International Search Report for PCT/EP2013/062609 dated Dec. 27, 2013.

* cited by examiner

DEVICE FOR CUTTING AND TRANSFERRING A STRIP FOR THE ASSEMBLY OF A TIRE

This application is a 371 national phase entry of PCT/EP2013/062609, filed 18 Jun. 2013, which claims benefit of French Patent Application No. 1255900, filed 22 Jun. 2012, the entire contents of each of which are incorporated herein by reference for all purposes.

BACKGROUND

1. Field

The disclosure relates to the field of tire building, and more particularly to the phase during which profiled components are assembled on a rotary receiving surface.

More specifically, the disclosure relates to the device for cutting and transferring a strip of profiled element from a means for letting off a length of strip from a continuous strip and cutting it to length up to the complete laying-down of this length of strip on a receiving surface, generally a rotary one.

2. Description of Related Art

Devices for cutting to length are widespread in the tire industry and are known as servicers. They often form an integral part of the tire building device and collaborate with one or more receiving surfaces facing which they are positioned at a specific moment in the tire building cycle.

The cutting tool positioned upstream of the servicer allows a length of strip to be detached from a continuous strip fed to the tire building device. This length of strip may be formed of a rubber profiled element, of a reinforcing element itself made up of textile or metal reinforcing threads coated in rubber and arranged parallel to one another making a given angle with the longitudinal direction of the length of strip, or even a preassembly of a rubber profiled element with a reinforcing strip.

The problem facing those skilled in the art is that of controlling the deformation of the front and rear edges of the length of strip, which deformations occur at the moment of cutting when the elastic tensions are released.

Numerous devices for correcting these deformations so that the front and rear edges have profiles that can be butted together during the operation of assembling the two edges on the receiving surface have been proposed.

Thus, among the more notable elements of the prior art, publication U.S. Pat. No. 4,769,104 proposes realigning the edges using orientable arms. Publication EP 649 730 or even publication EP 1 447 210 proposes measuring the deformations of the front edge and adapting the deformation of the rear edge accordingly by altering the transfer speed between input belts or by acting directly on the rear edge using orientable grippers.

All of these publications therefore aim to act on the profile of the edges after the length of strip has been detached and the elastic stresses released.

Nevertheless, it is found that the geometric characteristics of the products prior to cutting, particularly when considering products containing reinforcing threads, are relatively well controlled and meet the required tolerances. In other words, the elastic stresses mentioned hereinabove are trapped within the product which remains stable as long as it is not cut.

SUMMARY

Hence it has been considered advantageous to define a device and a method that allow the front and rear edges to be held in position from the cutting step to the end of the final laying-down of the length of strip on the receiving surface, and also that allow to maintain the position of these edges throughout the step of transfer from the cutting device to the tire-building drum by having the length of strip accompanied by suitable holding devices.

The cutting and transfer device according to an embodiment of the invention is intended to let off lengths of strip from a continuous strip, comprising a first face and a second face, so that these can be laid on a rotary receiving surface on which the various components that make up a tire are assembled.

This device comprises:
 a cutting means, comprising a cutting blade, able to separate the said length from the continuous strip along a cutting line,
 a telescopic conveyor belt, arranged in a longitudinal direction between the cutting means and the receiving surface, and intended to receive the length of strip via the first face thereof,
 a first half-anvil, arranged upstream of the cutting line, and comprising holding means able to grasp the strip via a first face,
 a transporter, having holding means able to grasp the front edge of the length of strip via a second face, the transporter being translationally driven in the longitudinal direction.

This device is characterized in that it comprises a second half-anvil intended to collaborate with the first half-anvil, and positioned downstream of the cutting line and upstream of the conveyor belt, comprising holding means able to grasp the rear edge of the length of strip via the sad first face, and translationally driven in the longitudinal direction.

During cutting, the first half-anvil holds that part of the strip that is intended, after cutting, to become the front edge of the strip, and the second half-anvil holds that part of the strip that is intended, after cutting, to become the rear edge of the length of strip cut to length. The front edge of the strip, which is intended to become the front edge of the length of strip after cutting, is held by the transporter.

After the length of strip has been detached, the conveyor belt moves the length of strip in a way that is synchronized with the transporter that holds the front edge of the length of strip, and with the second half-anvil that holds the rear edge of the length of strip and the movement of which causes the conveyor belt to fall back. The translational speed of the belt is adjusted so that it too is synchronized with the circumferential speed of the receiving surface. The transporter therefore lays down the front edge on the rotating receiving surface. During this transfer, the rear edge remains held by the second half-anvil until the transporter comes to grasp the said rear edge in order to lay it down in turn on the receiving surface.

As a result, the front and rear edges of the length of strip are held in the position that they occupy relative to one another in the continuous strip, throughout all of the steps ranging from the cutting step during which a length of strip is let off up to the complete laying-down of the said length of strip on the receiving surface.

BRIEF DESCRIPTION OF DRAWINGS

The description that follows relies on FIGS. 1 to 6 in which.

DETAILED DESCRIPTION OF SPECIFIC EMBODIMENTS

As indicated, the figures are schematic, and in particular the lengths of the lengths of strip appear to vary from one figure to another. This is down to the choice to depict the device according to an embodiment of the invention as clearly as possible without systematically conforming to a sense of scale or proportion.

Figure 1:
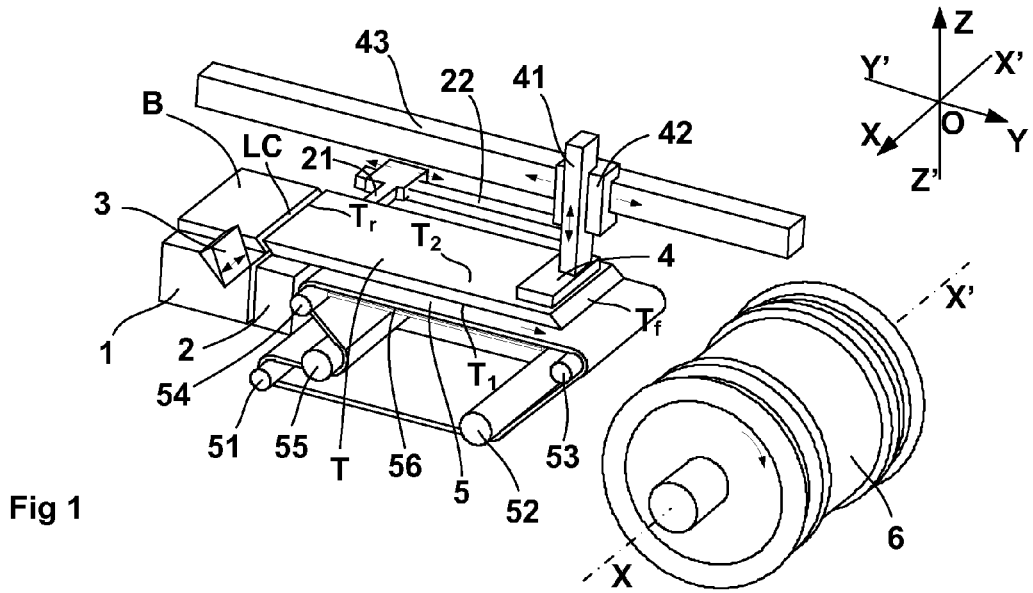
FIG. 1 schematically depicts a perspective view of a cutting and transfer device according to an embodiment of the invention, FIG. 2 schematically depicts a perspective view of the telescopic support table of the telescopic conveyor belt, FIG. 3 schematically depicts a view of the device according to an embodiment of the invention in its two extreme positions, FIGS. 4, 5 and 6 schematically depict perspective views of the device in the main steps of the method for implementing it.

The device according to an embodiment of the invention and depicted in FIG. 1 comprises a receiving surface 6, in this instance made up of a cylinder rotating about an axis XX'.

Positioned upstream of the receiving surface is the cutting and transfer device according to the invention which comprises, starting towards the downstream end of the device, a first half-anvil 1, a second half-anvil 2, a cutting means 3, a telescopic conveyor belt 5 and a transporter 4.

The continuous strip B comes from a feed means (not depicted) situated upstream of the cutting and transfer device.

The first half-anvil 1, arranged upstream of the device, is stationary. The first half-anvil 1 comprises holding means able to grasp the strip by holding it by the first face $T_1$ thereof, which in this instance is the underside face.

The second half-anvil 2 is positioned just downstream of the first half-anvil 1 and likewise comprises holding means able to grasp the strip or the length of strip by the first face $T_1$ thereof. The second half-anvil 2 is borne by a carriage 21 moving translationally along a rail 22 along a longitudinal axis YY'. The carriage 21 is motorized by means (not depicted) able to make the second half-anvil move according to the steps of the method for implementing the device.

Positioned in line with the downstream limit of the first half-anvil 1 is a cutting means 3 formed of a blade able to cut the strip B along a cutting line LC.

When the strip is cut, the second half-anvil 2 is positioned bearing against the first half-anvil 1 to form a complete anvil on which the strip rests in order to bear the force of the cutting blade without deformation.

In the step that precedes activation of the blade 3, the holding means of each of the half-anvils 1 and 2 are activated so as to prevent any movement of the strip during the actual cutting.

The cutting blade runs substantially along the line of contact between the two half-anvils so that after the blade has passed, the front edge of the strip and the rear edge of the length of strip remain held in the position corresponding to the position that they had in the strip prior to cutting.

It goes without saying that when the cutting line LC makes a given angle smaller than 90° with the longitudinal direction Y'Y, the downstream limit of the first half-anvil 1 and the upstream limit of the second half-anvil 2 need to make the same angle with the longitudinal direction.

A transporter 4, mounted on a mast 41, is borne by a carriage 42 running along the axis YY' on a rail 43. The mast 41 is able to move in a direction ZZ' perpendicular to the axes XX' and YY'. In a similar way to the two half-anvils, the transporter comprises means able to grasp and hold the strip or the length of strip via the second face $T_2$ thereof. Under the action of a motor (not depicted), the transporter shuttles between a position situated substantially above the first half-anvil, and a position situated substantially above the receiving surface, so as to come and grasp the edges of the length of strip each in turn, and hold onto them until the length of strip has been completely laid down on the receiving surface. The up and down movement of the mast 41, controlled by a motor (not depicted), makes it easier for the transporter to effect its longitudinal movements when it has to grasp one of the edges of the length of strip or when it has to lay them down on the receiving surface.

The holding means with which the half-anvils 1 and 2 or the transporter 4 are equipped are suited to the type of product of which the strip is made. Use may advantageously be made of electromagnetic or controlled-magnetization means when the continuous strip contains metal reinforcers, and when it does not, use may be made of suction-type holding means connected to a vacuum unit.

A telescopic conveyor belt 5 is positioned between the cutting tool and the receiving surface. In the case of the example supporting the present description, this conveyor belt is formed of a conveyor belt that runs between rollers 51, 52, 53, 54, 55 the axes of which are parallel to the axis XX'. The strip or the length of strip rests via the first face $T_1$ thereof on that surface of the conveyor belt that lies between the rollers 53 and 54.

The rollers 54 and 55 are able to move in the longitudinal direction YY' and may beneficially be borne by the carriage 21 which supports the second half-anvil 2. Likewise, the roller 53 may likewise be brought closer to the receiving surface by moving in the longitudinal direction. This setup allows the second half-anvil 2, which adjoins the upstream part of the conveyor belt, to be moved longitudinally by causing the rollers 54 and 55 to advance simultaneously and by reducing the surface supporting the belt, while keeping the conveyor belt under tension.

Figure 2:
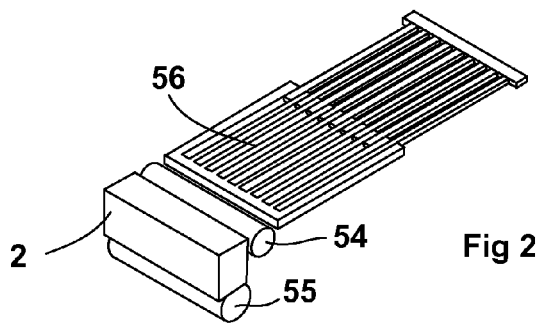

A telescopic support table illustrated in FIG. 2 is arranged under the surface of the conveyor belt between the rollers 53 and 54 with a view to compensating for the effects of gravity applied to the strip of product B supported by the telescopic conveyor belt.

Figure 3:
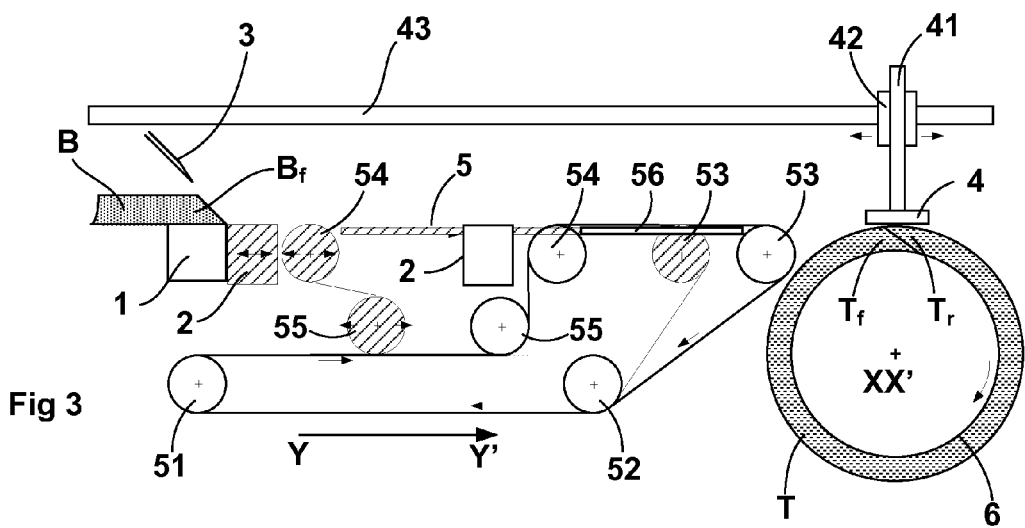

FIG. 3 provides a visual of the respective positions of the various rollers 53, 54 and 55 in relation to the movement of the second half-anvil 2 which is able to move between a position in which the two half-anvils 1 and 2 are in contact with one another (the position depicted with hatching) and a position in which it adjoins the upstream part of the telescopic conveyor belt 5 in the retracted position (position depicted without hatching).

In order to allow precise control over the movements of the rollers and of the second half-anvil, and the rotation of the receiving surface, it is advantageous to provide motorizing members that can easily be indexed, of the stepping motor type for example, and controlled by a central member, so as to ensure that these various movements are synchronized and coordinated.

Figure 4:
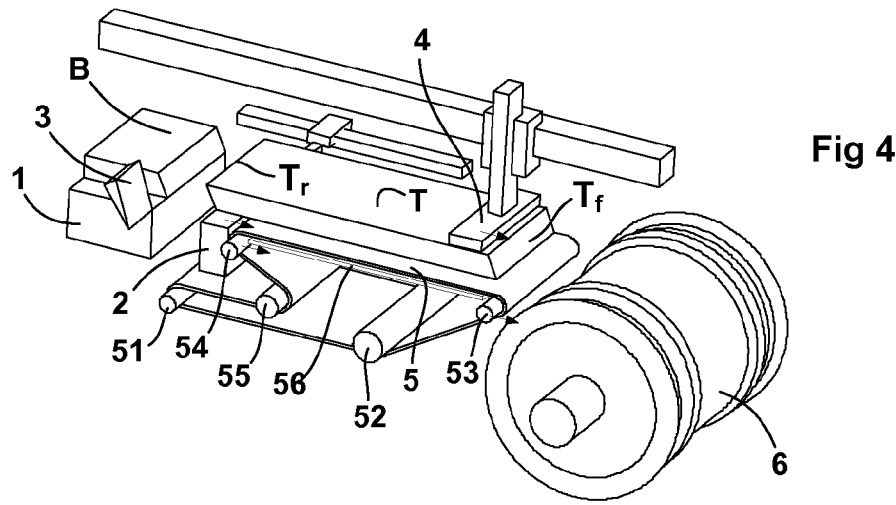
Figure 5:
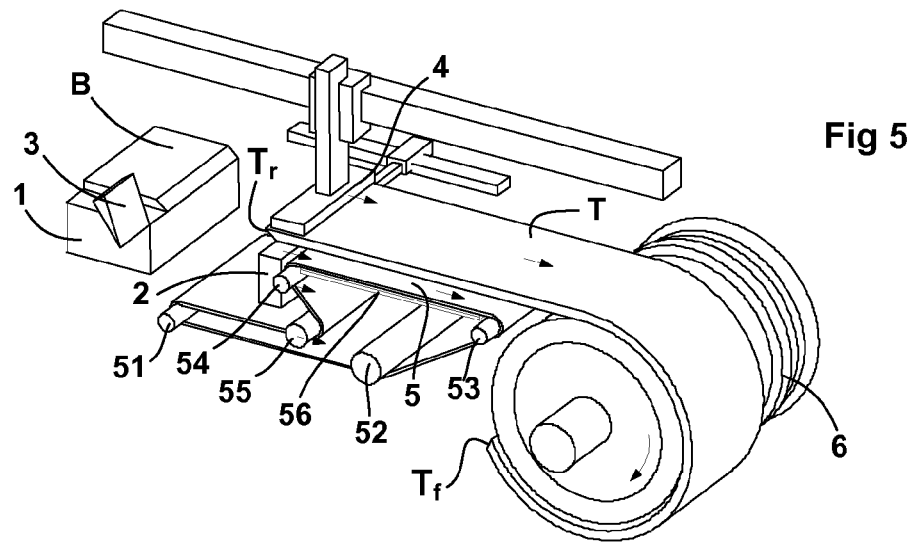
Figure 6:
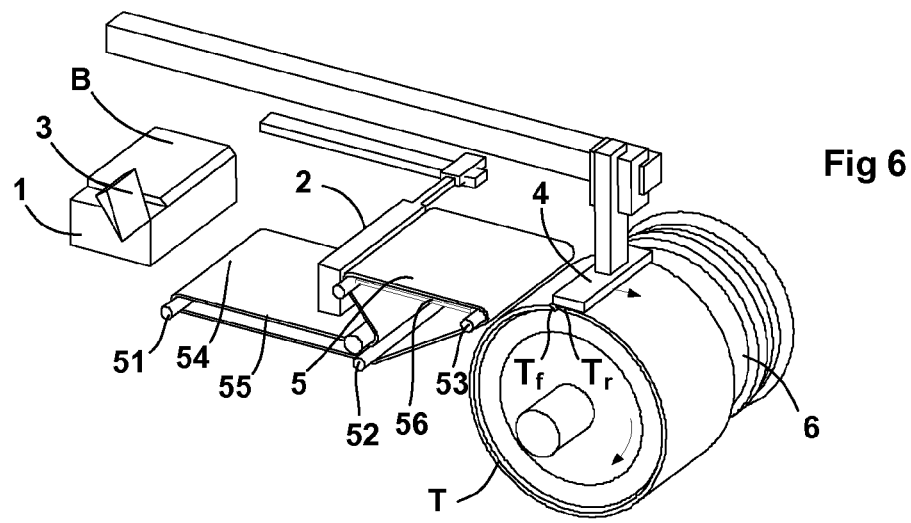

FIGS. 4, 5 and 6 provide a visual of the various positions of the cutting and transfer device during a manufacturing cycle.

To begin the cycle, the two half-anvils 1 and 2 are brought into contact with one another and the bearing surface of the telescopic belt is extended to its maximum length so that the upstream part of the said conveyor belt adjoins the downstream part of the second half-anvil 2.

The front edge of the strip is held by the first face $T_1$ thereof in position using the holding means of the first half-anvil. The transporter 4 is then positioned over the first half-anvil and the front edge $T_f$ of the continuous strip B is grasped via the second face $T_2$ thereof, in this instance the top face thereof. The grasping means of the first half-anvil 1 holding the front edge $T_f$ of the continuous strip are then released.

While continuing to hold the front edge $T_f$ of the strip using the transporter 4, the continuous strip is let out in the longitudinal direction over a determined length, laying it down on the bearing surface of the telescopic belt while at the same time causing the transporter and the telescopic belt in a synchronous manner to progress at the same linear speed.

Once the length of strip has been adjusted to length, the first face of the strip is grasped using the two half-anvils 1 and 2.

The cutting means are then activated so as to cut the strip along the cutting line LC, to free a length of strip. It will be seen that the front edge of the strip B corresponds to the front edge $T_f$ of the next length of strip.

The length of strip is then progressed along the telescopic belt by causing the second half-anvil 2 which holds the rear edge $T_r$ of the said length of strip, and the transporter 4 which holds the front edge $T_f$ to advance simultaneously as illustrated in FIG. 4.

Throughout these operations, the advance movement of the conveyor belt is kept synchronized with that of the second half-anvil while at the same time reducing the length of the bearing surface of the telescopic belt by reducing the spacing between the rollers 53 and 54 so that the length of strip does not experience any tension likely to modify the length thereof.

At the required moment in the tire building cycle, the head of the conveyor belt 5 is moved forward towards the receiving surface 6.

Then, using the transporter 4, the front edge $T_f$ of the said length T is moved closer to the receiving surface 6 and the said front edge $T_f$ is laid down on the receiving surface. Once the front edge $T_f$ has been anchored on the receiving surface 6, the holding means of the transporter are released.

The length of strip T is wound around the receiving surface 6.

After the transporter 4 has been released, the said transporter is returned to the level of the rear edge $T_r$ of the said length T and the rear edge $T_r$ of the length of strip T is grasped via the second face $T_2$ thereof, allowing the holding means of the second half-anvil which until this step had held the said rear edge to be released as shown in FIG. 5.

The movement of the transporter from the position in which it releases the front edge to the position in which it grasps the rear edge may be performed as an operation in parallel while at the same time the length of strip continues to be wound around the receiving surface. Likewise, the grasping of the rear edge $T_r$ may also be performed on the fly as long as appropriate commands are given to the motors that control the advance movement of the carriage 42.

Further, while continuing to lay the length of strip down on the receiving surface, the rear edge of the length of strip T is laid down on the receiving surface 6, as illustrated in FIG. 6.

Once the surface of the telescopic belt becomes free, the second half-anvil 2 is brought back into contact with the first half-anvil 1, and the rollers 54 and 55 are returned to the position that gives the telescopic belt its maximum extension.

Further, once the rear edge $T_r$ has been anchored, the holding means of the transporter are released and the transporter is returned above the first anvil and above the front edge of the strip so as to recommence with a further cycle.

These last two operations may of course be performed simultaneously.

It will be noted that, throughout these cutting and transfer steps, the front edges are held in position either by one or other of the half-anvils or by the transporter, and are not released until after they have been firmly anchored on the receiving surface 6. This means that the geometry of the front and rear edges remains unaltered and they therefore meet perfectly when making the final join.

It will also be noted that this device is entirely able to take into consideration the control algorithms used for applying products under tension, but which do not form part of the subject matter of the present invention.

The invention claimed is:

1. A device for cutting and transferring a length of strip (T) let off a continuous strip (B), the length of strip (T) and the continuous strip (B) each comprising a first face ($T_1$) and a second face (T2) and intended to be laid on a rotary receiving surface on which the various components that make up a tire can be assembled, and the device comprising:
    a cutter able to separate the said length of strip (T) from the continuous strip (B) along a cutting line (LC),
    a telescopic conveyor belt, arranged in a longitudinal direction (Y'Y) between the cutter and the receiving surface, and intended to receive the length of strip (T) via the first face ($T_1$) of the length of strip (T),
    a first half-anvil, arranged upstream of the cutting line (LC), and comprising a magnetic mechanism or a vacuum mechanism able to grasp the continuous strip (B) via the first face ($T_1$) of the continuous strip (B),
    a transporter, having a magnetic mechanism or a vacuum mechanism able to grasp a front edge ($T_f$) or rear edge ($T_r$) of the length of strip (T) via the second face ($T_2$) of the length of strip, said transporter being translationally driven in the longitudinal direction (Y'Y), and
    a second half-anvil adapted to collaborate with the first half-anvil during a cutting of the continuous strip (B) to define the length of strip (T), and positioned downstream of the cutting line (LC) and upstream of the telescopic conveyor belt, comprising a magnetic unit or a vacuum unit able to grasp the rear edge ($T_r$) of the length of strip via the first face ($T_1$) of the length of strip, and be translationally driven in the longitudinal direction (Y'Y) in sync with the transporter such that the rear edge ($T_r$) and the front edge ($T_f$) of the length of strip (T) are both grasped during movement of the length of strip (T) thereby allowing the length of strip (T) to not experience tension after the cutting as the transporter and second half-anvil and telescopic conveyor belt translate the length of strip (T) in the longitudinal direction (Y'Y), wherein the conveyor belt is arranged to translate the length of strip (T) on a bearing surface of the conveyor belt which extends from a first roller to a second roller, the device configured to cause the bearing surface to reduce in length by reducing a spacing between the first roller and the second roller during the translational driving of the second half-anvil.

2. The cutting and transfer device according to claim 1, wherein the second half-anvil is able to move between a position in which the two half-anvils are in contact with one another, and a position in which the second half-anvil adjoins an upstream part of the telescopic conveyor belt when the telescopic conveyor belt is in a retracted position.

3. The cutting and transfer device according to claim 1, wherein the cutter is a cutting blade that can be run substantially along a line of contact between the two half-anvils when the two half-anvils are in contact with one another.

4. The cutting and transfer device according to claim 1, wherein the transporter is able to move in the longitudinal direction (Y'Y) between a first position situated substantially above the first half-anvil, and a position situated substantially above the receiving surface.

5. The cutting and transfer device according to claim 1, wherein the half-anvils and transporter comprise electromagnetic or controlled-magnetization magnets.

6. The cutting and transfer device according to claim 1, wherein a part of the telescopic belt that is intended to receive the continuous strip (B) or the length of strip (T) runs over a telescopic support table.

7. The cutting and transfer device according to claim 1, wherein the transporter is able to move in a direction (ZZ') perpendicular to a plane of the conveyor belt (OXY).

* * * * *